United States Patent

Hultsch et al.

[11] 4,052,303
[45] * Oct. 4, 1977

[54] METHOD OF OPERATING A CENTRIFUGAL FILTER AND A FILTER CENTRIFUGE OPERATING ACCORDING TO THIS METHOD

[75] Inventors: Günther Hultsch; Kurt Zeppenfeld; Peter Niedner; Peter Ostermeyer, all of Munich, Germany

[73] Assignee: Krauss-Maffei AG, Munich, Germany

[ * ] Notice: The portion of the term of this patent subsequent to Aug. 27, 1992, has been disclaimed.

[21] Appl. No.: 662,163

[22] Filed: Feb. 27, 1976

Related U.S. Application Data

[63] Continuation-in-part of Ser. No. 423,579, Dec. 10, 1973, Pat. No. 3,943,056.

[30] Foreign Application Priority Data

Dec. 11, 1972 Germany .................. 2260461
June 19, 1973 Germany .................. 2331202

[51] Int. Cl.² .................. B01D 33/02; B04B 3/00
[52] U.S. Cl. .................. 210/78; 210/373; 210/378; 233/47 R
[58] Field of Search .................. 233/21, 22, 2, 20 R, 233/47 R, 1 A, 1 R; 210/66, 74, 78, 360 R, 372, 373, 369, 376, 377, 378, 379, 527

[56] References Cited

U.S. PATENT DOCUMENTS

| 1,336,722 | 4/1920 | Behr | 210/78 |
| 1,761,593 | 6/1930 | Sharples | 210/78 |
| 3,396,103 | 8/1968 | Huntington | 210/360 R |
| 3,788,470 | 1/1974 | Pelmulder et al. | 210/78 |
| 3,799,353 | 3/1974 | Pause | 210/369 |
| 3,814,246 | 6/1974 | Wilson et al. | 210/78 |

FOREIGN PATENT DOCUMENTS 983,690 2/1965 United Kingdom .................. 210/78

Primary Examiner—Frank W. Lutter
Assistant Examiner—Frank Sever
Attorney, Agent, or Firm—Karl F. Ross; Herbert Dubno

[57] ABSTRACT

A method of operating a filter centrifuge or centrifugal filter in which a hydrostatic head is provided at the filtering surface so as to control liquid passage therethrough. The head may promote movement of the liquid through the filter layer or may induce reverse flow of liquid for backwashing or rinsing. In addition, a hydrostatic balance may be provided at this surface through control of the head to limit passage of the liquid through the filter layer. Preferably the head provides a suction augmenting centrifugal filtration.

8 Claims, 20 Drawing Figures

FIG. IA
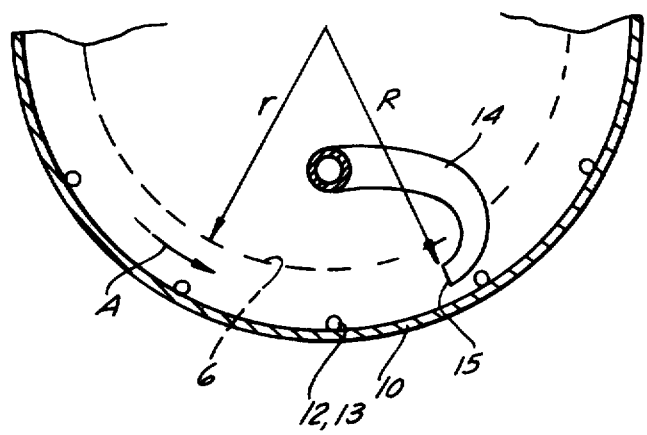
FIG. IB
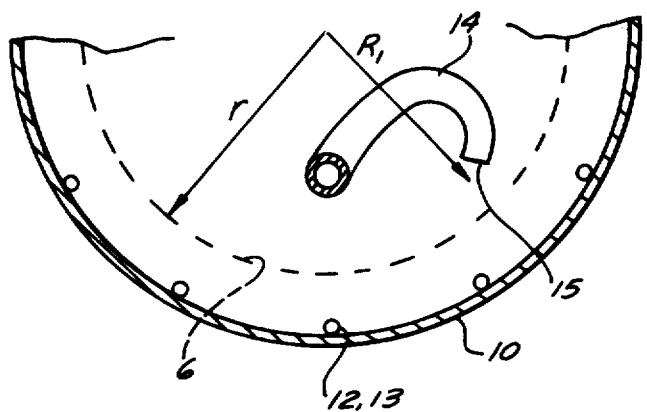

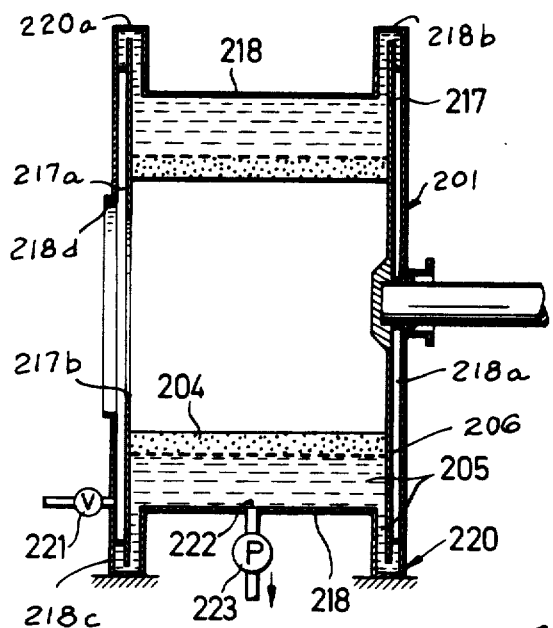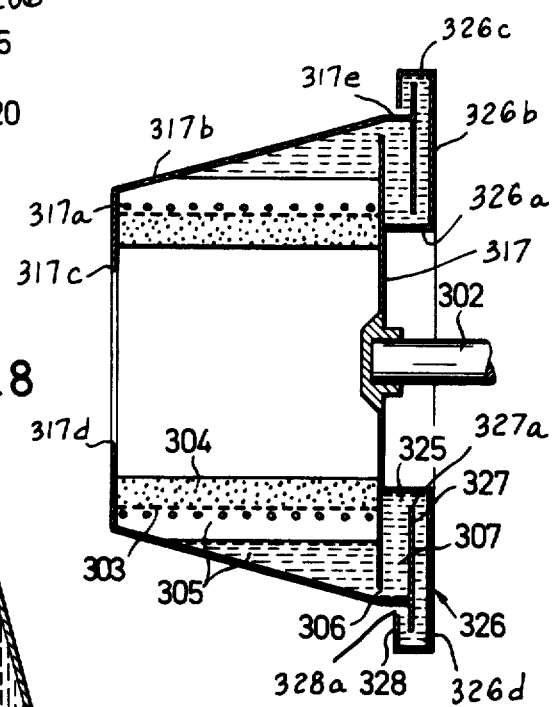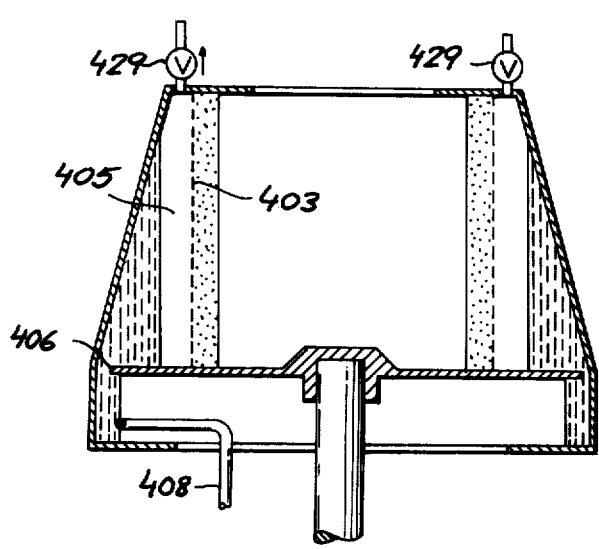

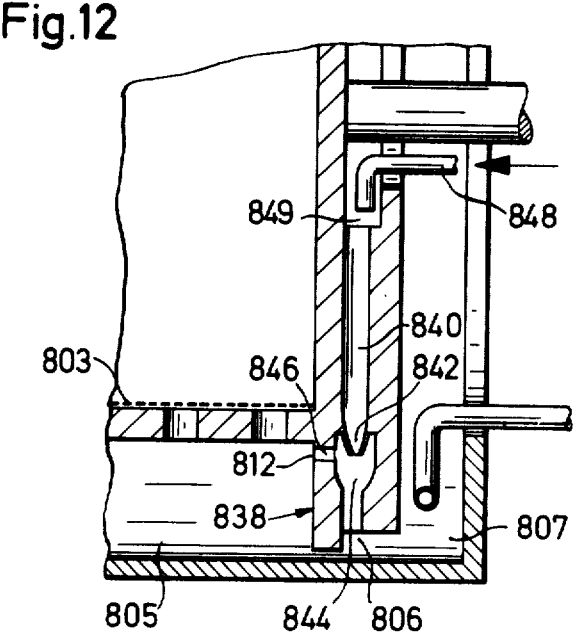
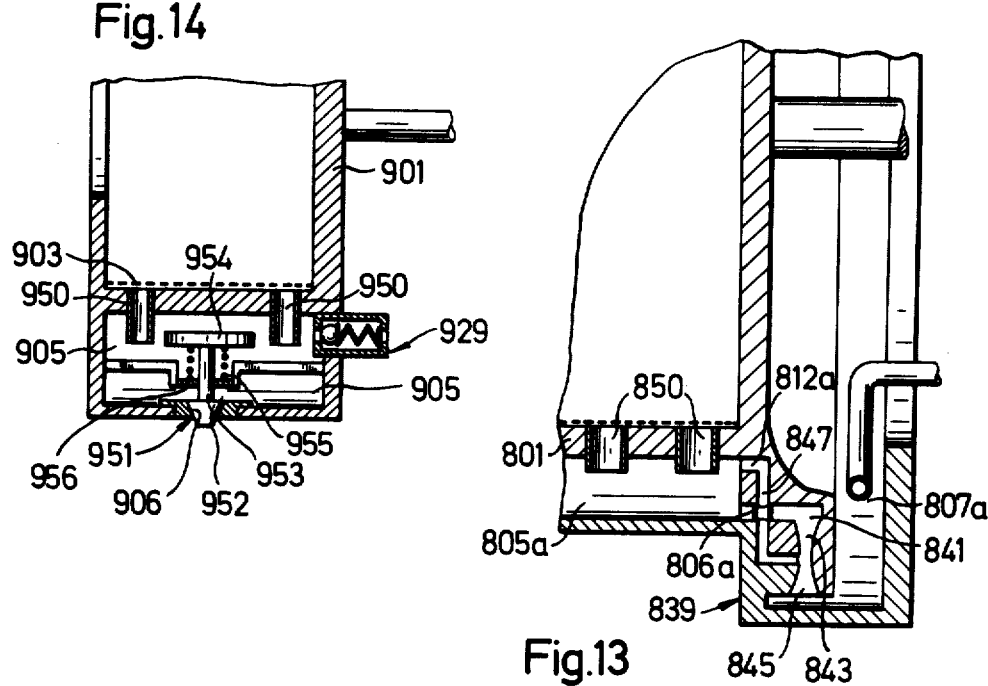

METHOD OF OPERATING A CENTRIFUGAL FILTER AND A FILTER CENTRIFUGE OPERATING ACCORDING TO THIS METHOD

CROSS-REFERENCE TO RELATED APPLICATION

This application is a continuation-in-part of Ser. No. 423,579 filed Dec. 10 1973 now U.S. Pat. No. 3,943,056 issued Mar. 9 1976.

FIELD OF THE INVENTION

The present invention relates to centrifugal filters or filter centrifuges and, more particularly, to improvements in filter centrifuge structures and especially to an improved method of operating a filter centrifuge.

BACKGROUND OF THE INVENTION

In general a filter centrifuge or centrifugal filter comprises a rotary basket or drum which may be driven at high speeds centrifugally to cast a suspension of particulate material in a liquid phase against a filter medium, e.g. filter cloth lining the drum. The centrifugal force drive the liquid phase through the filter medium on which the solid phase is retained in a filter cake.

It has been proposed to increase the throughput of such filters by hydrodynamically increasing the pressure differential across the filter medium, e.g. by evacuating liquid from the far side thereof and/or applying a fluid pressure to the downstream side thereof with respect to the direction of flow of the liquid through the filter medium. A system which only evacuates the space around the upstream side of the drum is limited in the pressure differential which can be applied by the vapor pressure of the liquid phase.

OBJECTS OF THE INVENTION

It is an object of the invention to extend the principles set forth in application Ser. No. 423,579 (U.S. Pat. No. 3,943,056).

It is another object of the present invention to provide an improved method of operating a centrifugal filter whereby disadvantages encountered with earlier systems can be avoided, more effectively results can be obtained with simpler filter structures, and control of a filtration process is facilitated.

It is another object of the present invention to provide a centrifugal filter of simple construction and facility of control, which structure also is characterized by a throughput controllable as desired.

SUMMARY OF THE INVENTION

These objects and others which will become apparent hereinafter are attained, in accordance with the present invention, in a method of operating a filter centrifuge, especially for the filtration of suspensions to separate a liquid phase from the solid phase, in which a suction effect is provided at the filter medium and wherein the filter centrifuge is provided with a liquid-collecting compartment having at least one discharge opening.

According to the invention, radially outwardly of the filter medium there is provided a liquid column or head which generates a hydrostatic pressure acting at the filter cake and controllable to regulate the pressure differential across the filter medium and/or the filter cake.

While the hydrostatic head can also be provided by a controlled pumping action or by throttled outflow, it is preferred to form a further compartment in fluid communication with the liquid-collecting compartment through the aforementioned discharge opening or openings so that a level difference (as measured radially from the axis), exists in the two compartments to establish the liquid head. According to the invention, therefore, a hydrostatic head, as distinct from the hydrodynamic pressure differential used heretofore, is controlled to adjust the ratio of the pressures on opposite sides of the radially outer surface of the filter cake and thereby regulate the passage of liquid through the filter cake and the filter medium or create a condition in which liquid passage therethrough is at standstill.

The system just described does not, therefore, utilize the hydrodynamic suction effect of conventional systems to induce liquid transport across the interface between the filter medium and the deposited solids, but rather relies upon a hydrostatic effect (siphon effect) at this interface or the so-called displacement principle to induce the transport of liquid across the interface. In other words, the process of the present invention utilizes the static component is of the BERNOULLI equation compared to which the dynamic component is negligible.

The utilization of the hydrostatic suction effect allows correspondingly higher filtrate throughputs to be achieved such that a suction of about 10 meters (water column) below atmospheric and corresponding to the vapor pressure of the liquid used is attainable. Such suction levels have not even been approximated with prior-art filter centrifuges without enormous expenditure.

According to another feature of the invention, prior to the main filtration, air is eliminated from the collecting compartment and is excluded therefrom by the liquid present therein and in the centrifuge drum. Thus the present invention further comprises the step of expelling air from the collecting compartment preferably by the backflow of liquid into the latter from the other compartment of the liquid head. The air is thus expelled through the filter medium and a liquid continuum is created at least from the interface between the filter medium and the collected solids to the free liquid surface of the other compartment of the liquid column.

Throughout this description, reference will be made to a liquid head or a liquid column, terms which are commonly used in systems in which the liquid is confined in a column as in a manometer. This terminology has been adopted here notwithstanding the fact that the collecting compartment in an annular chamber and that the other compartment communicating therewith and axially offset from the liquid-collecting compartment is also generally an annular chamber.

Since the present system is concerned with a centrifugal arrangement, the free surface of the liquid in the other compartment will lie at a distance R from the axis of rotation of the drum. The aforementioned interface may lie at radial distance r from the axis of the drum so that $R = R + h$, where h is the radial difference ($R - r$) and corresponds to the difference between liquid levels in a U-type manometer tube.

While in a manometer tube the difference between liquid levels represents a pressure differential or head depending upon the liquid density and the gravitational force at the location of the manometer, in a centrifugal system the head is a function of this dimension $h$, the liquid density and the centrifugal acceleration. Hence the distance $h$ represents a true liquid head and the continuum of liquid from the interface to the free surface constitutes a hydrostatic liquid "column" generating this head.

In the system in which the free surface of the other compartment lies radially outwardly of the interface between the filter medium and the collected solids and a continuum of liquid is established between this interface and the free surface, the head $h$ is a suction head tending to displace liquid through the filter cake and the filter medium. When the free surface lies radially inwardly of the interface, the head tends to displace liquid in the opposite direction (from the exterior inwardly) through the filter medium to drive air therefrom to commence siphon action. The substantial exclusion of air is thus necessary in the establishment of the liquid continuum upon which the hydrostatic effect previously described is based.

It should, of course, be noted that since the "head" involved in the present case is a function of centrifugal action, orientation of the centrifuge drum is not material except as it may affect the manner in which the liquid continuum is maintained.

According to another feature of the invention the liquid is not discharged from the collecting compartment during the discharge of air therefrom.

It has previously been mentioned that the liquid head for displacing the liquid through the filter medium of the centrifuge is constituted as the differential head of two interconnected liquid columns. In the case in which both these columns have equal heights (measured along the radius), the system resembles a U-tube with equal-length arms such that the hydrostatic pressure differential is eliminated and the only filtration which can occur is that brought about by pumping action.

The levels of the two liquid columns which generate the resultant pressure differential or head mentioned previously, should most advantageously be adjusted radially externally of the filter cake. This adjustment can be carried out so that the pressure differential approximates the vapor pressure of the liquid so that a further drop below the vapor pressure of the liquid results in a transformation of a portion of the liquid column to the vapor phase. The differential head is preferably steplessly adjustable between the vapor pressure of the liquid (maximum filtration) and a negative pressure differential of several atmospheres (corresponding to the backflow of liquid) through a pressure differential which, in dependence upon the centrifugal action, brings about standstill of the liquid phase of the interface.

A reduction of the filtrate throughflow velocity is desirable, for example, upon changeover from filtration to washing under conditions in which the penetration of air into the filter cake is to be avoided. A protracted filtration (low filtrate flow rate) is also desirable for solvent washing, extraction processes and similar techniques. Furthermore, it is frequently desirable to fill this centrifuge during an interlude of low or throttled filtrate flow rates to obtain a uniform distribution of the solids over the interior of the centrifuge drum and without reducing the speed of the drum as has been required heretofore.

To exclude air from the system and establish the liquid continuum, a liquid is initially introduced through the discharge compartment and the opening or openings connecting same with the liquid-collecting compartment, i.e. by an initial reverse flow of liquid toward the filter medium from the exterior of the drum. This drives any air trapped in the collecting compartment through the filter cake and it has also been found to be desirable to force a portion of this liquid through the filter cakes or the filter medium. A reverse flow of this type may be used whenever air accumulates in the collecting compartment and threatens to interrupt the liquid continuum or whenever a washing of the collected solids is required or rinsing (back-washing) of the filter medium is desirable.

According to another feature of the invention, externally of the liquid-collecting compartment and preferably in the centrifuge housing, there is established a controllable superatmospheric pressure with a gaseous medium. Under these circumstances the effective filtration pressure can be the sum of the superatmospheric pressure applied to the centrifuge housing and the head developed by the liquid columns. The superatmospheric pressure can be, for example, two bars. This can increase the effective hydrostatic suction head to about 20 meters (water column as calculated at the acceleration of gravity) which would correspond to an acceleration of 500 G at the drum with a radial head $h$ of about 40 mm.

According to another important feature of the invention, during the main filtration process, only sufficient liquid is withdrawn through the discharge opening that a surface of the suspension is formed radially within the filter medium and is there maintained.

It will be appreciated that normal filtration generally operates with the approach that the liquid phase (filtrate) should be drained as rapidly as possible so that the suspension (solid particles dispersed in the liquid phase) has no free or continuous surface within the filter medium or inwardly thereof in a filter centrifuge unless the latter is not operating with a sufficient throughput.

However, the present system operates most effectively when a liquid continuum is maintained within the liquid-collecting chamber or compartment and up to at least the interface between the filter medium and the accumulated and collected solids forming the filter cake upon the filter medium.

It has been found that the effect of this continuum is augmented by limiting the rate at which the liquid phase is drawn through the filter medium so that radially inwardly thereof the continuum is maintained by the suspension of solid particles in the liquid phase. This ensures that the "displacement"-type suction commences within the filter cake or immediately adjacent the latter and that air will not penetrate into the filter cake or into the liquid-collecting compartment to interrupt the liquid continuum prematurely.

Advantageously, to choke off the filtration (passage of filtrate through the filter medium) the two liquid columns to either side of their connecting passages are adjusted so that the pressures on opposite sides of the radially outermost surface of the filter cake are approximately equal. This can be obtained by increasing the radial height of the liquid in the axially outermost compartment, thereby reversing the pressure head to balance the head of the liquid within the drum as measured radially inwardly from this outermost surface of the filter cake.

With this technique, the filtration can be brought completely to standstill, a possibility which is signficant not only for the interchange from a filtration operation to a washing operation, but also when fresh suspension is not supplied and an interruption of the liquid continuum is undesirable. For example, assume that the supply of the suspension to be filtered is interrupted. The liquid phase previously forming the suspension would otherwise traverse the filter cake, the filter cloth and even the liquid-collecting compartment. Before filtration is commenced anew, it would be necessary to drive out the air which has thus penetrated as previously described for the initial steps in the filtering process. When, however, hydrostatic balance is achieved at the outer surface of the filter cake, i.e. at the interface between the filter medium and the filter cake, the throughflow of the liquid phase can be terminated with a layer of liquid overlying the filter cake or at least the filter medium so that air penetration is not a problem.

It has been found to be desirable that, upon termination of the main filtration, the pressure radially outwardly of the filter cake is so adjusted that a reduction of the level of the suspension surface with respect to the filter cake is effected in a progressive manner, until finally the surface of the liquid lies at the radially outer surface of the filter cake. This progressive draining of the filter cake under the hydrostatically controlled pressure promotes drying of the filter cake.

According to the apparatus aspects of the invention, the filter centrifuge of the present invention can comprise a housing enclosing a filter drum which is rotatable about an axis and is formed with a perforated or otherwise liquid-permeable supporting surface centered on the axis and adapted to carry the filter medium, e.g. a layer of filter cloth lining the interior of the drum. The drum is formed, outwardly of this liquid-permeable surface, with the liquid-collecting compartment which communicates at a location radially spaced from the filter medium with the discharge outlet.

According to a feature of the invention, a wall lying in a plane perpendicular to the axis forms the base of the drum and is, in turn, formed with the discharge apertures which open into the aforementioned "other" compartment axially offset from the liquid-collecting compartment and likewise annularly extending around the axis of the drum. The two compartments are thus disposed on opposite sides of the wall. Means is provided for adjusting the level of the liquid in this other compartment which, together with the liquid-collecting compartment form a pair of liquid columns having liquid levels which may lie at different radial distances from the axis to define the hydrostatic head mentioned previously. The term "level" is here used to describe the position of the liquid surface in the compartment as centrifugally created and disposed at the desired distance from the axis.

In the system claimed in the above-mentioned prior application it is required that the drum axis be horizontal. However it has been found that, while the horizontal axis is preferable in some cases it is not essential and the centrifugal operations allow a vertical axis to be used as well.

According to a particularly advantageous feature of the invention, the outlet openings are connected with a siphon arrangement which may be constituted by the annular liquid-collecting compartment, the discharge openings and the annular discharge compartment which is likewise concentric with the axis of rotation of the centrifuge and which communicates with the discharge openings by inlet openings in the wall of the discharge compartment.

When the inlet and discharge openings are at the same distance from the axis of rotation of the drum, they may simply be opposite sides of bores formed in the wall defining the base of the drum and separating the two compartments from one another.

In another construction, however, whereby the head can be greater than in the embodiment just described, the discharge or second compartment is disposed radially outwardly of the liquid-collecting compartment and the inlet openings are connected with the discharge openings by tubes.

The liquid-removal means preferably constitutes a skimmer tube whose skimming end or mouth can adjustably be disposed in the region between the distance of the filter medium from the axis and the distance of the inlet openings therefrom. Preferably the skimmer end is displaceable by swinging the skimmer tube about an axis parallel to the axis of rotation of the drum and advantageously disposed between the skimmer mouth and the drum axis.

With this embodiment it is possible to permit the liquid level in the annular discharge chamber to have a greater radius than the liquid level in the liquid-collecting compartment (as measured from the axis of the drum) and thereby creates a negative head, i.e. a hydrostatic head favoring passage of the filtrate through the filter cake and the filter medium. The head corresponds to the product of the difference between the radii of the liquid level, the centrifugal acceleration and the density of the liquid. The difference between the radii corresponds by a similar arithmetic procedure to the hydrostatic differential between the pressure in the interior of the centrifuge drum and the reduced pressure in the liquid-collecting chamber.

This reduced pressure can be lowered to a value corresponding to the vapor pressure of the liquid at the controlling temperature and is automatically maintained by the centrifuge according to the present invention using the combination of a siphon and a liquid skimmer. Of course, the pressure differential across the filter cake and filter medium also depends upon the supply of liquid and the flow of liquid from the filter cake.

With a constant liquid level (radial) in the discharge part of the siphon device, for example, by an appropriate adjustment of the mouth of the skimming tube, the throughflow of liquid traversing the perforated wall of the drum into the liquid-collecting compartment is maintained constant even as the solids accumulate on the inner wall of the drum. The liquid flow across the filter medium is thus equal to the liquid removed over a given time span from the discharge compartment of the siphon. The suction is maintained at the filter medium until influx of the suspension terminates and liquid is drained from the system so that air begins to enter the filter cake. Between the commencement of filtration and this interruption of the liquid continuum, the suction filtration is automatic and self-regulating without any special need or expense for control.

The separation of suspensions with the filter centrifuge of the present invention thus can be designated primarily as a pressure-stage filtration.

According to a feature of the invention, the inwardly open outer compartment, which may be generally trough-shaped, can be formed with a plurality of openings at different distances from the axis of rotation of the centrifugal drum and selectively openable to adjust the radial level of the liquid in this outer compartment. Thus, after liquid completely fills the liquid-collecting compartment and has reached a corresponding level in the outer compartment, a port radially spaced from the axis by a distance greater than the radial spacing of the suspension surface within the drum, can be opened to generate a hydrostatic head promoting suction through the filter medium.

Alternatively, or in addition, the outer compartment can be provided with an inwardly extending annular apron lying in a plane perpendicular to the axis and having an inner edge which lies radially outwardly of the filter medium to form a weir across which the liquid can flow in accordance with siphon principles. When this weir arrangement is used, the liquid can be deflected through a further bend to increase the siphon force or form a trap preventing the influx of gas into the system.

It has also been found to be advantageous in some cases to provide a simple outlet or construction for the liquid-collecting compartment which may be formed by a throttle valve or the like designed to have the same effect as the outer compartment mentioned earlier. In this case, the outlets from the liquid-collecting compartment must be disposed at a greater radial distance from the axis of the drum than the filter medium.

According to still another feature of the invention, means is provided for evacuating air or other gases from the space around the filter medium, i.e. the liquid-collecting compartment, to facilitate filling of the latter with liquid whether from an external source or from the filtrate of the suspension which is to be separated. To this end, passages may be provided in a wall of the liquid-collecting compartment and can open radially outwardly of the filter medium, these passages being connected to a suction pump built into the drum or remote therefrom. Alternatively, a check valve may be provided to permit unidirectional displacement of air out of the system by the filtrate or a siphon-starting liquid.

It has also been found to be advantageous in some cases to provide the liquid-collecting compartment between a fixed housing structure and the rotatable drum and, for this purpose, the drum may be provided with one or more radially extending annular projections which extend into annular pockets of the fixed housing or merely subdivide the fixed housing into the liquid-collecting compartment or the compartment from which liquid is drained to sustain the siphon effect.

In order to reduce the frictional effect of relative rotation of the liquid and the rotating drum or the stationary housing, means may be provided along the exterior of the drum to effect entrainment of the liquid in the collecting compartment or the liquid-collecting compartment itself may be reduced in axial width by providing it between a pair of inwardly extending axially spaced annular partitions flanking a pair of outwardly extending annular vanes disposed inwardly of the end of the drum.

In accordance with still another feature of the invention, the liquid-collecting compartment is provided on the drum and the latter has a centrifugally closed valve which prevents escape of liquid until the liquid level (in the radial sense) builds up sufficiently to sustain a siphon-type suction at the filter medium. The valve can have a flow which responds to the liquid level to open the outlet and permit throttled drainage of the liquid-collecting compartment.

In general, the centrifuge can have either a vertical or a horizontal axis of rotation and the embodiments described hereinafter may be shown to have one or the other, but if shown to be horizontal can also be vertical.

The liquid-collecting compartment will extend in either case circumferentially around the filter medium which may be a filter cloth supported on a perforated plate, grate or the like. While it is preferred to have the liquid-collecting compartment increase in cross section toward the outer compartment, it is also possible to constitute the liquid-collecting compartment only of the interstices of the grate, grind or the like supporting the filter medium. In the latter case tubes or the like can connect the liquid-collecting space with the outer space disposed radially outwardly of the filter medium. The drum may also be formed with a plate subdivided the liquid-collecting compartment from the outer compartment and providing the clearance radially outwardly of the filter medium through which liquid communication is established or formed with bores establishing such communication.

BRIEF DESCRIPTION OF THE DRAWING

The above and other objects, features and advantages of the present invention will become more readily apparent from the following description, reference being made to the accompanying drawing in which:

FIG. 1A is a sectional view taken generally along the line IA — IA of FIG. 1;

FIG. 1B is a section similar to FIG. 1A;

FIG. 7 is an axial cross-sectional view of a filter centrifuge drum in which the air-withdrawal device likewise constitutes the system for draining the liquid phase;

FIG. 8 is an axial cross-sectional view through a drum of centrifugal filter in which the siphon is provided with means for increasing the hydrostatic suction force;

FIG. 9 is an axial cross-sectional view through a filter centrifuge drum provided with other means for removal of gas, e.g. including check valves;

FIG. 12 is an axial cross-sectional view of the siphon portion of a filter centrifuge drum having an additional suction device;

FIG. 13 is a view similar to FIG. 12 and like FIG. 12 represents a modification of the system of FIG. 5 in which the suction device is formed by a liquid jet pump or ejector; and FIG. 14 is an axial cross-sectional view through the lower portion of another filter centrifuge drum having a floatcontrolled discharge opening for the liquid-collecting compartment.

SPECIFIC DESCRIPTION

In the following description all embodiments with the possible exception of those of FIG. 1, 1A, 1B, 2, 3c, 7, 8 and 14 can operate effectively in rotation about vertical or horizontal axes.

Figure 1:
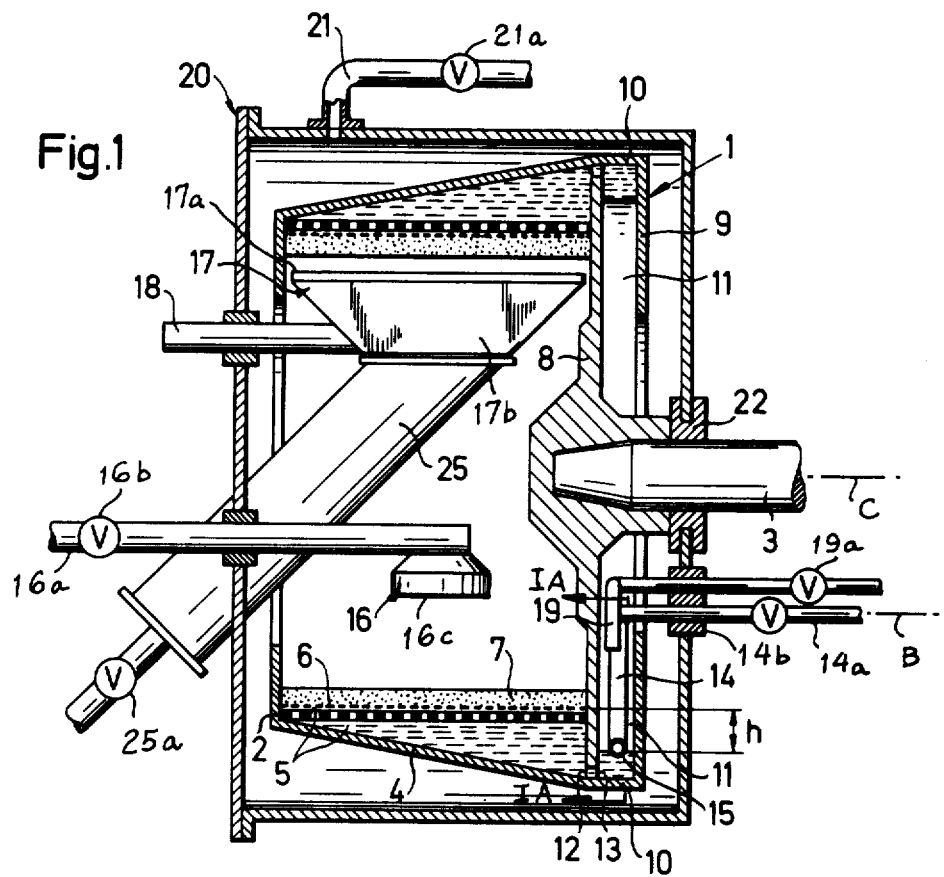
FIG. 1 is a longitudinal section, somewhat in diagrammatic form, in a centrifuge according to the present invention.

In FIGS. 1, 1A, 1B and 2, similar reference numerals have been used to designate similarly functioning parts. In these Figures, there has been illustrated a centrifugal filter having a filtering drum 1 which is formed with a perforated cylindrical shell or wall 2 mounted upon a shaft 3 for rotation about the horizontal axis of this shaft. The drum 1 is formed with a jacket 4 which defines a liquid-collecting compartment 5 radially outwardly of the layer 7 of solids collected along the inner wall of this drum. In the embodiment of FIG. 1 and FIGS. 1A and 1B this liquid-collecting compartment increases the cross-section axially toward the base of the drum and in both FIG. 1 and FIG. 2, the liquid-collecting compartment 5 reaches substantially to the radially outermost surface of the collected solids. Thus in the embodiment of FIG. 1, the liquid-collecting compartment 5 includes the perforations of the cylindrical wall 2.

The liquid-collecting compartment thus represents the totality of all of the interstices of the filter medium, e.g. a filter cloth 6 and all of the openings and passages of the perforated plate or grate supporting this filter medium. Any further spaces radially outwardly of the medium and communicating with the supporting perforated plate or grate likewise is considered to constitute part of the liquid-collecting compartment.

The filter medium 6, which has been illustrated diagrammatically as a filter cloth but may be a preformed layer of filter particles or any other medium permeable to the liquid phase whose flow cross-section is such as to prevent passage of the solid phase, rests upon the perforated shell 2 in the embodiment of FIG. 1 and, in turn, supports the filter cake 7 of collected solids.

The base of the drum (FIG. 1) is formed with a wall 8 which separates the liquid-collecting compartment 5 from a discharge compartment 11 which is disposed in axially offset relationship with respect to the liquid-collecting compartment 5.

The compartment 11 is thus defined between the drum base 8 and an annular wall or apron 9 lying parallel to the drum base 8 in a plane perpendicular to the axis of rotation of the drum. A narrow axially-extending cyclindrical wall 10 bridges the walls 8 and 9 and thus constitutes the compartment 11, an inwardly opening annular trough for which the wall 9 functions as a weir. The floor 10 of the compartment 11 lies radially outwardly of the perforated wall 2 of the drum and hence the extreme outer face of the filter 7.

In the region of its largest diameter, the liquid-collecting compartment 5 is formed with a plurality of individual discharge opening 12 which communicate with inlet openings 13 in the drum wall 8 in the region of the largest diameter of the annular compartment 11, i.e. in the region of the trough bottom 10.

A swingable skimmer tube 14 projects downwardly into the trough-shaped compartment 11 and has a tube end 15 so adjustable that it may be moved from an inner position close to the radial distance of the inner filter cake surface from the axis to a position close to the regions of the openings 13. The range of mobility has been illustrated in FIGS. 1A and 1B from which the configuration of the skimmer tube can also be noted. The tube end 15 opens against the sense of rotation of the drum so that the liquid in the trough-shaped compartment 11 rotationally entrained by the drum, for example, in the counter-clockwise sense A as represented in these Figures, it carried into the oppositely open end 15 of the tube 14 which, in turn, carries the liquid away to maintain the liquid level in compartment 11 substantially at the position of the mouth 15. The tube 14 is mounted upon a horizontal pipe 14a which is swingable in a seal 14b about a horizontal axis B parallel to the horizontal axis C of rotation of the drum. A supply device 16 serves to introduce the suspension into the filter drum 1. This supply device may comprise a duct 16a formed with a control valve 16b for establishing the flow of the suspension to the drum and a distributing head 16c for spraying the suspension substantially uniformly over the axial length of the inner wall 2 of this drum.

A scraping arrangement 17 is provided to remove the collected solids from the filter cake 7 and comprises an adjusting element 18. The scraper arrangement and the adjusting element are of known configuration and can include a blade 17a at the upper edge of a hopper 17b which communicates with a chute 25 leading from the housing 20 of the centrifuge. A valve 25a diagrammatically represents means for blocking the chute during the filtering process to prevent loss of pressure within the centrifuge.

Figure 2:
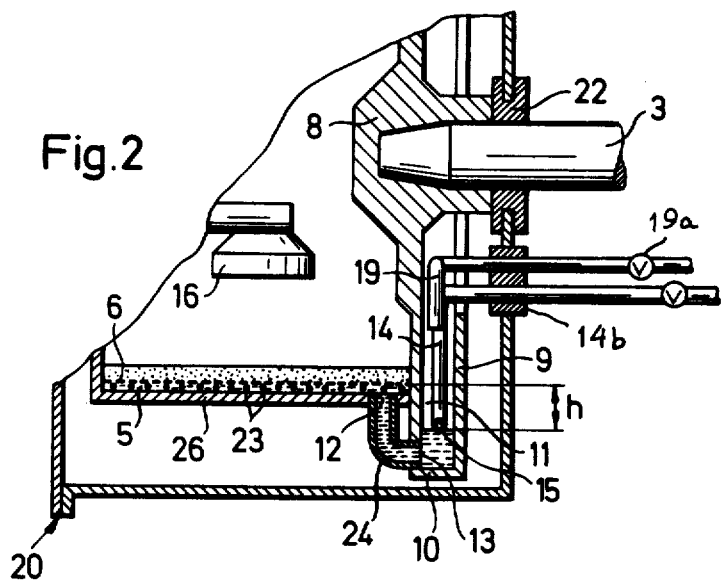
FIG. 2 is a section of a fragement of a centrifuge according to another embodiment of the invention but with functional chracteristics similar to those of the centrifuge of FIG. 1.

In the system illustrated in FIGS. 1 and 2, a filling tube 19 is provided for delivering liquid as controlled by a valve 19a to the trough-shaped compartment 11 for starting the siphon action and driving air from the siphon arrangement. Of course, this function may also be performed by the skimmer tube 14 with appropriate repositioning of the valve 19a to communicate therewith.

The housing 20 encloses the centrifuge drum and hermetically seals the latter. A pipe 21, connected via valve 21a or another suitable control element, can communicate with a compressor or source of inert gas (i.e. a tank of nitrogen or argon) to pressurize the centrifuge. The pipes, ducts, etc. 16, 17, 14, 18 and 19 as well as the shaft 3 are in the usual manner sealed with respect to the housing 20. A seal for this purpose has been shown at 22 which hermetically retains the pressure within the housing 20 but permits rotation of the shaft 3. The apparatus has a conventional drive (not shown) for the latter shaft.

In the apparatus of FIG. 2, the liquid-collecting compartment 5 differs from that of FIG. 1 in that it consists only of the relatively small space around a supporting grate 23 for the filter cloth 6. The grate 23 may be made of bars or wires running circumferentially along the inner wall of the drum shell 26 and carrying the filter cloth. Of course, a grid, screen or like arrangement may also be used.

In the embodiment of FIG. 2, moreover, the outlet openings 12 are formed directly in the cylindrical wall of the shell 26 and are connected by short bent tubes 24 with the inlet openings 13 of the annular discharge compartment 11. In this embodiment, as in the embodiment of FIG. 1, a skimming device 14 of adjustable penetration into the trough-shaped compartment 11 is employed.

The system of FIGS. 1, 1A, 1B and 2 operates substantially as follows:

At normal (ambient) pressure within the housing 20, liquid is admitted by the filling pipe 19 into the compartment 11 of the drum which is rotated at its normal centrifugal filtration speed. No suspension is to be found within the drum and no filter cake overlies the filter cloth. Liquid (water) is admitted in this fashion until the level in the liquid-collecting compartment 5 rises to the filter medium 6 or extends to a small distance radially inwardly thereof. During this procedure, all of the air is driven out of the liquid-collecting compartment 5. The mouth 15 of the skimmer tube 14 is, during this period swung radially inwardly to the maximum extent permitted by the structure (see FIG. 1B).

Using the feed device 16, the suspension of solid particles in liquid (e.g. water) is introduced into the interior of the drum and is centrifugally distributed uniformly over the interior of the drum. The filtrate tends to displace the previously introduced liquid from the liquid-collecting compartment 5 until its level within the interior of the drum 1 and the level in the annular compartment 11 are identical.

The flow of filtrate through the system is then accelerated by swinging the mouth 15 of the skimmer tube 14 radially outwardly as quickly as possible, the liquid being driven into the mouth of the tube and out of the system by the pumping action of the drum. Since this immediately lowers the liquid level in the outer compartment 11 to that determined by the setting of the mouth of skimmer tube 14, a hydrostatic pressure drop is applied across the liquid column between the mouth of the skimmer tube 14 and the surface of the liquid within the drum. A similar suction can be measured between the outlet opening 12 and the inlet opening 13. The suction force augments the filtration by centrifugal action.

The suction force is, as previously noted, a function of the difference in the levels of the liquid in the annular compartment 11 and the liquid-collecting compartment 5, representing the reduced pressure manifested in an upright-tube manometer.

In this case, the liquid level in the liquid-collecting compartment 5 can be represented at $r$ and is considered to lie just at the filter cloth while the liquid level in the outer compartment is considered to be at R, both distances being measured from the axis B of rotation of the drum. As a consequence, the head is a function of the difference $h = (R - r)$ and, of course, is also a function of the centrifugal acceleration and the density of the liquid.

For continuous operation, the suspension is permitted to flow continuously into the drum by the feed arrangement 16 and the skimmer tube 14 is maintained in the position shown in FIGS. 1 and 1A so that a liquid continuum maintains the syphon over the entire filtering interval. More generally and most advantageously, the suspension is introduced intermittently into the drum and the above-described sequence of steps is repeated for each fresh introduction of the suspension, i.e. the skimmer tube is swung rapidly into the trough 11 for each fresh addition of suspension to accelerate the filtration.

The reduced pressure brought about by the siphon effect generally cannot, of course, lie below the vapor pressure of the liquid at the operating temperature although it can reach this pressure by merely appropriately dimensioning the radii of the liquid-collecting compartment 5 and the annular trough 11 and with an appropriate removal of liquid from the latter.

The suction effect can be augmented when, where a filter cake 7 is present in the centrifuge, the liquid introduced at 19 is first forced through the filter cake and preferably has a level slightly inwardly thereof upon startup of the centrifuge. In this case, the filtrate is rapidly drawn by the siphon effect through the filter cake as well as the filter medium. The air trapped within the filter cake is thereby first displaced by the backflow of the siphoning liquid.

Upon commencement of filtration, the mouth of the skimmer tube 14 is swung inwardly and simultaneously the pressure in housing 20 can be increased so that the gas pressure differential across the siphon is augmented at the same time as the siphon liquid is accelerated by extraction of liquid from the annular trough 11. In this case, the annular trough 11 may be held under atmospheric pressure while the elevated pressure is applied at the interior of the drum. Of course, in the embodiment illustrated in FIG. 1, the interior of drum 1 and the annular compartment 11 are both exposed to the same elevated gas pressure and this pressure serves to drive fluid out of the trough 11 through the skimmer tube 14. The pressure may be provided in the form of an inert gas atmosphere in accordance with the principles of pressure-stage filtration.

In FIGS. 3a – 3e there are illustrated various modifications of a filter centrifuge according to the present invention.

Figure 3A:
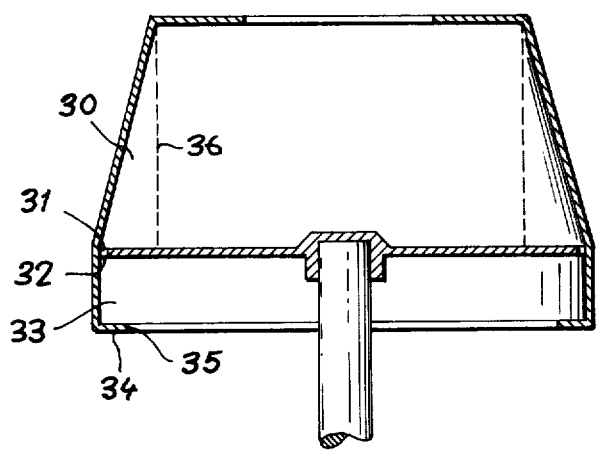
FIG. 3a is a diagrammatic section of a centrifuge with a vertical axis.

In FIG. 3a, for example, the centrifuge drum, which has been illustrated diagrammatically, comprises a liquid-collecting chamber 30 surrounding the filter medium 36 and communicating by apertures in the base of the drum with a trough-shaped annular compartment 33. These apertures lie along the outer periphery of the drum and are constituted as simple bores whose side turned toward the liquid-collecting compartment 30 is represented as outlets 31 while the side turned toward the annular trough 33 is represented as inlets 32. The annular compartment 33 is formed with a wall 34 functioning as a weir, the weir edge 35 being disposed outwardly of the filter medium 36. In other words, the radial distance between the vertical axis of rotation of the drum and the overflow edge 35 of the weir 34 is greater than the radius of the filter medium 36 but smaller than the spacing of the inlet openings 32 from the axis. Since the edge 35 lies outwardly (radially) of the filter medium, the siphon effect induces continuous suction until the liquid level in the collecting compartment 30 moves outwardly to the level of this edge. The system of FIG. 3a can thus operate without a skimmer tube.

Figure 3B:
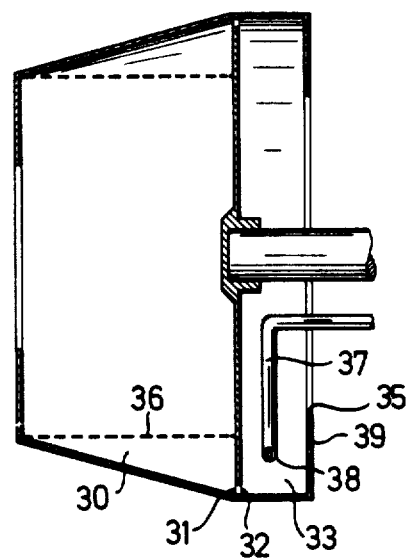
FIG. 3b is a diagrammatic longitudinal section illustrating an additional centrifuge configuration according to the present invention and although having a horizontal axis of rotation may be disposed with a vertical axis.

In FIG. 3b, there has been illustrated a system of the type generally discussed in connection with FIGS. 1A and 1B, and in which a skimmer tube 37 has a swingable mouth or end 38 which can penetrate into the inwardly open circumferential trough 33 in the operative position of this tube. In an inoperative position, however, the mouth of the skimmer tube may be swung inwardly beyond the overflow edge 35 of an apron 39 forming a weir. In this embodiment, the edge 35 lies somewhat inwardly of the filter medium 36. The other elements of the drum of FIGS. 3b bear reference characters identical to the corresponding elements of FIG. 3a. In operation, the weir 35, 39 is effective during initial filling of the apparatus with the suspension and until the level of the suspension within the drum has reached the level (radial) of the edge 35. At this point, the skimmer tube 37 may be swung about its axis (parallel to the axis of the drum) to bring its end 38 rapidly into the trough 33 to increase the suction action as described in connection with FIGS. 1 and 2. The radial distance between the edge 35 and the axis may coincide with the innermost surface of the filter cake overlying the filter medium 36 in the maximum thickness of the filter cake. Preferably, however, the radial distance of edge 35 from the axis of the drum is approximately equal to, or slightly greater than the radial distance of the filter medium 36 from this axis.

Figure 3C:
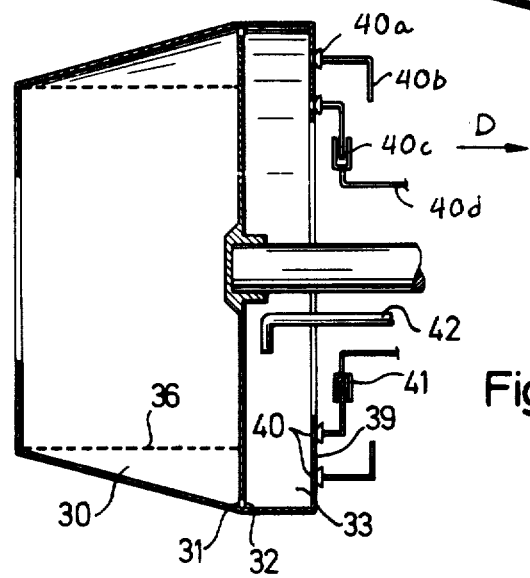
FIG. 3c is a view similar to FIG. 3b but illustrating another embodiment.

In the modification of FIG. 3c, the liquid can be drawn off from the annular trough 33 through bores spaced apart at different radial distances from the axis, thereby eliminating the need for a skimmer tube although the skimmer tube as described in conjunction with FIGS. 1, 1A, 1B, 2 and 3b can also be used to supplement these bores. The bores 40 are formed in the apron or wall 39 defining the annular compartment 33 and are provided with plugs which have been diagrammatically illustrated at 30a in FIG. 3c. These plugs each carry stems 40b which are turned inwardly and are received in U-channels 40c of actuating members 40d so that the stems 40b may freely rotate and can be axially withdrawn (arrow D) to open the respective bores. The bores 40, at different distances from the axis, may be selectively opened or closed to establish the desired level of liquid in the trough 33 and hence the suction effect. A filling tube 42, analogous to the tube 19 described in connection with FIGS. 1 and 2, may be provided to supply liquid to the trough 33 to drive out air from the system and to begin the siphon action. The innermost edge of the apron 39 here preferably lies inwardly of the filter medium 36 at least to the extent illustrated and described also in connection with FIG. 3b.

Figure 3D:
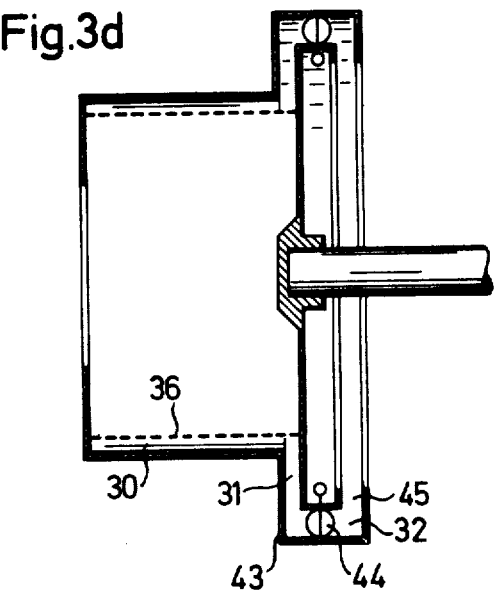
FIG. 3d is another similar view.

In the embodiment of FIG. 3d, the siphon effect is similar to that generated in FIG. 3a, i.e. derived from the fact that the overflow edge of the weir formed by the apron lies radially outwardly of the filter medium 36. In this embodiment, the outlet compartment 45 is annular and communicates via circumferentially spaced siphon tubes 43 whose discharge and inlet portions are represented at 31 and correspond to the similarly designated elements of the embodiments of FIGS. 3a - 3c. Each of these siphon tubes 43 is provided with a closure member 44, e.g. a butterfly valve, to prevent a premature draining of liquid from the siphon and entry of air into it when the suspension supply to the drum terminates or the liquid level within the drum falls toward the level defined in the weir. The valve members 44 may be actuated automatically, e.g. by a float system as will be described in greater detail hereinafter, or by some operator-controlled actuating arrangement as described in conjunction with FIG. 3c. By preventing liquid draining beneath the inner surface of the filter cake, penetration of air into the latter, into the filter medium and into the liquid-collecting compartment can be precluded and the time required for driving air from the system and re-establishing the liquid continuum can be conserved.

Figure 3E:
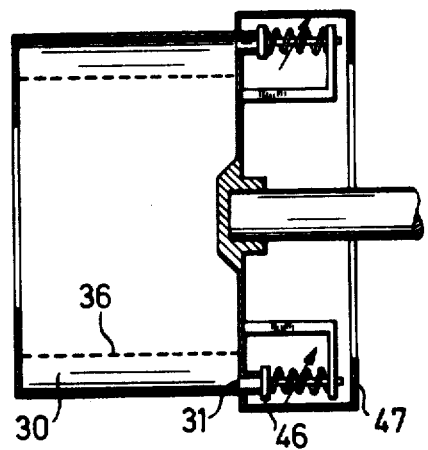
FIG. 3e is still another view of this type.

FIG. 3e diagrammatically represents an arrangement in which the closure members or valves 36 are spring-biased axially movable plates which normally block the openings 31 unless a pressure head favoring the suction effect is produced. When the suction head is sufficient, these valves are displaced to permit flow of fluid in accordance with the siphon principle, the springs of the valves having adjustable strengths to permit the resulting throttling effort to be varied at will. The adjustability is represented by arrows in FIG. 3e and can be accomplished with force transmitting or control rods or similar members as described in connection with FIG. 3c or by any conventional centrifugal governor arrangement. The siphon system is represented generally at 47 and includes the outlet sides of the closures 46. The closures 46 are immersed in the trough or pocket formed by this siphon. This system also limits penetration or air into the liquid continuum.

Figure 4:
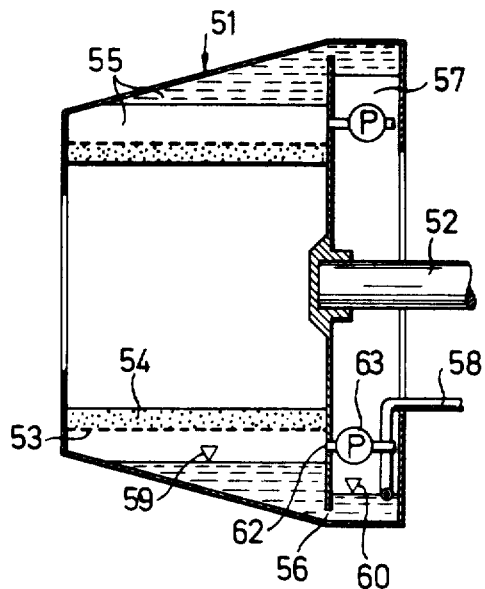
FIG. 4 is an axial cross-sectional view through a filtercentrifuge drum provided with an air-suction device for drawing air from the liquid-collecting compartment.

FIG. 4 shows schematically an embodiment of the invention in which the drum 51 is rotatable about a horizontal axis on its shaft 52 and is provided with a support (not shown) which may be of the type described in connection with FIGS. 1 or 2 for a filter medium 53. Preferably the filter medium is a filter cloth overlying a support grid. The filter cloth carries the filter cake 54. Radially outwardly of the filter medium 53, the drum 51 is formed with a liquid-collecting compartment 55 communicating via openings 56 with an annular trough-shaped compartment 57 beneath the right of the bottom plate of the drum. The liquid (filtrate) is discharged from the latter by a skimmer tube 58 which may be of the type described in connection with FIGS. 1A, 1B and 2, swingably mounted so that its mouth may be introduced into the trough 57 to vary the level 60 of liquid therein. The swingable skimmer tube is designed to maintain a siphon effect between the level 60 in compartment 57 to provide the suction effect at the interior of the drum. A pump 63 can be connected via an opening 62 above the level 59 of liquid in compartment 55 to draw air from the system in a manner to be discussed more fully below.

Figure 5:
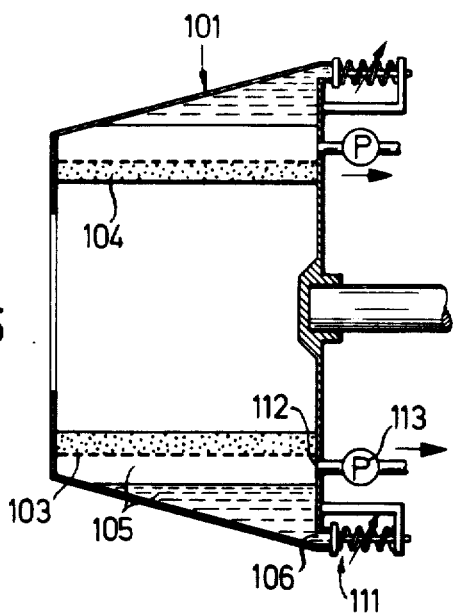
FIG. 5 is an axial cross-sectional view through a filter-centrifuge drum provided with another air suction device and a closure for the liquid-collecting compartment.

Similarly, the drum 101 of the filter centrifuge of FIG. 5 carries the filter cake 104 upon the supported filter medium 103 and is formed with a liquid-collecting compartment 105 outwardly of this filter medium. The outlets 106 of this compartment are provided with throttle valves 111 generally similar to the valve 46 described in connection with FIG. 3e. The closures 111 thus permit throttle outflow and maintain a siphon effect under the centrifugal action of the drum. Air can be drawn from the space immediately below the filter medium by a pump 113 communicating via a passage 112 with the liquid-collecting compartment immediately outwardly of the filter medium.

Figure 6:
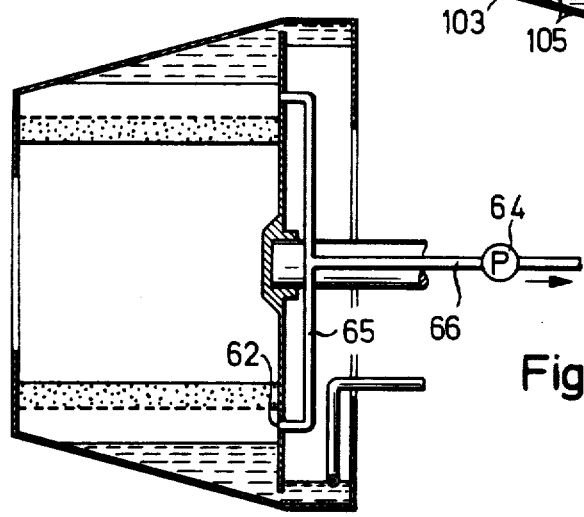
FIG. 6 is an axial cross-sectional view through a filter centrifuge provided with another air-suction arrangement for filling the siphon.

FIG. 6 shows another system for evacuating air from the liquid-collecting compartment immediately outwardly of the filter medium, such means including a suction pump 64 connected via a pipe 66 to a plurality of radial ducts 65 which communicate with passages 62 opening into the liquid-collecting compartment immediately outwardly of the filter medium and any support provided therefor.

In the embodiments of FIGS. 4 - 6, the residual air can be eliminated by the pumps 63, 64 and 113 shown in the drawing to establish the liquid continuum and create or maintain the hydrostatic siphon-type suction effect.

The embodiment of FIG. 7 comprises a centrifuge drum consisting of a base plate 217 carried upon the shaft formed with a cylindrical support (not shown) for a filter medium 206 upon which the filter cake 204 is deposited in the manner previously described. The housing 218 has a backplate 218a and is formed with a trough-shaped annular pocket 218b into which the plate 217 extends to define a siphon arrangement represented at 220. When the drum 201 also carries a front plate 217a formed with an opening 217b through which the suspension may be introduced, this plate likewise extends with clearance into a pocket 218c at the front end of the otherwise cylindrical housing 218. The latter is provided with a mouth 218d, registering with the opening 217b through which the suspension may be introduced and the solids may be removed as described generally in connection with FIG. 1. Consequently, a siphon pocket 220a is also formed at the front end of the drum. Liquid can be discharged from the system via a valve 221 which has been schematically illustrated and forms a siphon arrangement as in the embodiment of FIG. 4 or has the function of the throttle valve of FIG. 5. The siphon effect produces a suction which promotes filtration in the manner previously described.

In addition, the fixed housing wall is provided with a discharge opening 222 which can communicate with a pump 223 by which air and/or liquid is drawn from the liquid-collecting compartment. Consequently, no separate filling liquid is required to establish the siphon effect since, after the suspension has been introduced into the drum, pump 223 may be operated to draw liquid into the liquid-collecting compartment until the latter is completely filled thereby displacing any air from the system. The pump has the further advantage in this embodiment, in common with the systems of FIGS. 4 – 6 that, following the filtration and complete draining of filtrate, air or other gas can be drawn through the filter cake to dry the latter.

FIG. 8 represents a simplified version of the filter centrifuge in which the base plate 317 is carried by the shaft 302 and is formed with a grid represented generally at 317a and supporting the filter medium 303. The latter carries the filter cake. The grid 317a is fixed to the casing 317b of the drum which has an inwardly turned apron 317c defining an opening 317d through which the suspension is introduced and solids are removed, e.g. with the aid of the devices illustrated in FIG. 1 for this purpose. The casing 317b, which is generally frustoconical, terminates in a cylindrical extension 317e which carries an annular disk 327 wholly received with clearance in an outer housing structure 326. The latter comprises a cylindrical inner wall 326a mounting on the rear surface of plate 317 or formed by this plate. A radial annular flange 326b is carried by the wall 326a and lies parallel to the disk 327 but is axially offset to the right therefrom. Outwardly of the disk 327 and radially spaced therefrom, the outer housing portion is formed with a cylindrical wall 326c which terminates in an apron 328, again lying parallel to the disk 327 and axially spaced to the right thereof. The walls 328 and 326b flanking the disk 327 define, with the wall 326c, outer troughs 326d for which the edge 328a forms a discharge weir in the manner previously described, e.g. in connection with FIG. 3a. In addition, the plate 317, the wall 326a and the wall 326b define an inner trough 325 which communicates between the liquid-collecting compartment 305 and the trough 326b behind the disk 327. This system creates automatically the aforedescribed suction effect with the aid of a liquid column.

Thus at the beginning of the filtration, only the collecting compartment 305 and the annular space 307 are filled with liquid and, with the progress of filtration, liquid passes over the inner edge 327a of the disk 327 to drive air ahead of it and eventually force liquid into the trough 326d and over the weir 328a. For this reason the edge 327a must lie rearwardly outwardly of the level of the suspension medium within the drum at least at the inception of operation of the filter centrifuge. In general terms, it has been found to be advantageous to locate the edge 327a at the same radial level as the filter medium. Once liquid passes the edge 328a, the siphon effect is created and continues until the liquid-collecting compartment is fully drained. The trough 326d acts as a trap preventing inflow of air and its output position augments the siphon effect as will immediately be apparent.

The discharge of air from the liquid-collecting compartment 405 can be promoted by providing check valves 429 (FIG. 9) on the vertical-axis drum immediately outwardly of the filter medium 403. In this case, the liquid-collecting compartment 405 can be filled with liquid through a skimmer tube 408 extending into the discharge trough which communicates via ports 406 with the liquid-collecting compartment 405. Alternatively, a filling device such as that shown at 19 in FIG. 1 may also be used. The swingable skimmer tube 408 operates to control the level of the liquid in the outer trough as previously described.

Figure 10:
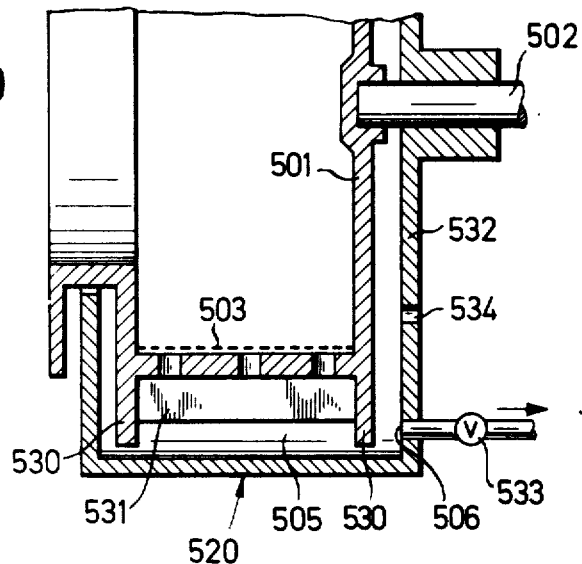
FIG. 10 is an axial cross-section view through a portion of a filter centrifuge drum representing a modification of the system of FIG. 7.

In FIG. 10 there is shown a filter centrifuge drum 501 rotatable on its shaft 502 and provided with a filter medium 503, e.g. a filter cloth overlying the perforated inner wall of this drum. The housing 520, as in the embodiment of FIG. 7, is stationary and defines a siphon compartment with the drum which is provided with axially spaced plates 530 forming weir-type rings around which the liquid can pass. An outlet 506, disposed radially outwardly of the filter medium 503 communicates with the liquid-collecting chamber 504 and is provided with a blocking valve 503 while an overflow port 534 can be formed in the rear wall 532 of the housing. Between the rings 530, the drum is provided with outwardly-extending scoop-like vanes for entrainment of the liquid in the collecting compartment in rotational movement.

At the beginning of the filtration process, the passage 506 is closed by the valves 533. With rotation of the drum, the liquid traversing the filter medium displaces air from the system until the liquid level in the pockets outwardly of the drum reaches the level of port 534. At this point, valve 533 can be opened to lower the liquid level in the outer compartments and induce a hydrostatic suction in the manner previously described. The openings 506 must, for this purpose, lie radially outwardly of the level of liquid within the drum and preferably outwardly of the filter medium.

Figure 11:
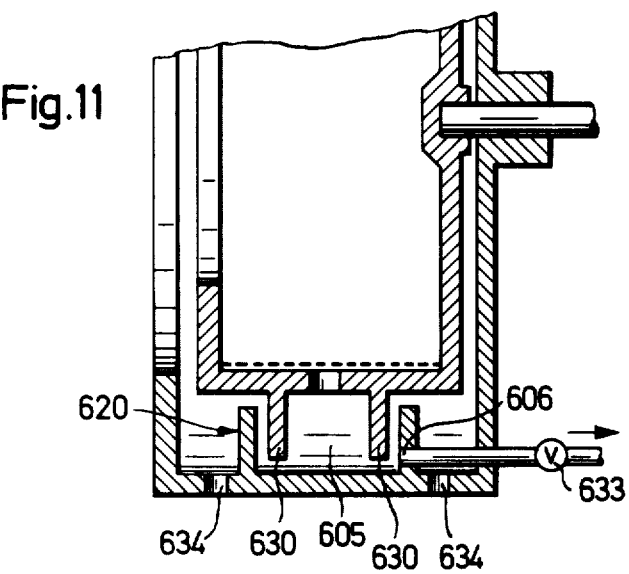
FIG. 11 is a view similar to FIG. 10 but representing another modification.

The filter centrifuge of FIG. 11 operates generally in accordance with the same principles but to reduce frictional engagement of the liquid with the rotating drum or rotating liquid with the stationary housing walls, an annular pocket 620 is formed inwardly of the ends of the drum with a smaller volume than that defined between the rings 530. The outwardly-extending annular flanges 630 of the drum, however, are flanked by the walls of the pockets 620 so that the liquid must flow outwardly around the flanges 630 and then over the walls of the pocket 620 before reaching the outlet 634. A passage 606 is formed in the walls of the pocket which defines the liquid-collecting compartment 605 and is provided with the valve 633. The apparatus of FIG. 11, of course, operates in a manner similar to that of FIG. 10.

FIGS. 12 and 13 illustrate two embodiments of the invention which have been illustrated more or less diagrammatically in FIGS. 5 and 6. However, in place of the suction pump 64 of FIG. 6, where the pump is located externally of the drum, the suction pumps of the embodiments of FIGS. 12 and 13 are so-called jet or ejector pumps 838 and 839. In this system, the liquid flowing from the liquid-collecting compartment 805, 805a under the hydrodynamic pressure of centrifugally displaced liquid, enters a conically constricted tube or passage 840 or 841 and is then ejected through a nozzle 842 or 843 into a further tube 844 or 845.

In FIG. 12, the passage 844 opens directly into the passage 806 communicating with the outer trough-shaped compartment 807 while in FIG. 13, the passage 805 opens into this compartment directly. In both cases, the jet pump operates as a venturi suction pump and a difference resides in the fact that all of the liquid passing through the outlet openings 806a of the embodiment of FIG. 13 also traverses the pump whereas a portion of the liquid can pass via outlet 806 in the embodiment of FIG. 12 into the compartment 807, thereby bypassing the pump. In the embodiment of FIG. 12, however, the liquid derives from an external source, e.g. a pipe 848.

Because of the reduction in cross-section of the nozzle 842 or 843, a suction is induced at the passages 846 and 847 to draw air from the liquid-collecting compartments. The pump of FIG. 12 may be used both to evacuate air from the system and to fill the system with liquid prior to filtration. At the end of the filtration process, the same pump may be employed to cause air to pass through the filter cake on the filter medium 803. In the system of FIG. 13, however, the suction effect terminates as all liquid is driven from the system. To permit at least partial hydrodynamic suction to be generated, the ports communicating with the liquid-collecting compartment are extended as shown at 850 to project below the surface of the perforated plate 801 so that some air may be trapped at the outer surface of this plate.

FIG. 14 shows a filter centrifuge in which the liquid-collecting compartment 905 is formed within a housing rotatable with and extending around the drum which carries the filter medium 903 in the manner previously described. The perforated inner wall of the drum has tubular extensions 950 projecting into the liquid-collecting compartment and the latter communicates with the atmosphere via a throttle device 951.

The throttle 951 comprises an outlet 906 having a conical configuration and a conical valve member 952 seated in this outlet. The valve member 952 is connected by a rod 953 to a float 954 and is biased in an opening direction by a spring 955 seated against a support 956. At a radially inner portion of the liquid-collecting compartment 905, a check valve 929 is provided to permit escape of fluid from the compartment but prevent entry of fluid into the latter.

The suspension is introduced into the rotating drum 901 in which centrifugal force holds a valve 951 closed against the force of spring 955 so that liquid collected in the compartment 905 cannot pass through this valve. The displaced air, however, is released through check valve 929.

The liquid level grows progressively inwardly until it lifts the float 954 to open the valve 954 and permit controlled outflow of liquid in the manner of a siphon. Should the liquid level fall excessively, the throttle 951 likewise closes to permit buildup of the liquid level. Radially inwardly air inflow, however, is limited by the check valve. A small air cushion thus remains in the system without materially affecting the operation as described. When the centrifuge is brought to standstill, the spring 955 opens the valve 951 and permits liquid to drain from the system.

While reference has been made to air in the preceding description, it should be noted that what was there said also applies to other gases which may be used or generated.

We claim:
1. A filter centrifuge comprising:
   a perforated drum rotatable about an axis;
   means forming an annular chamber around said drum and rotatable therewith;
   pump means for evacuating said chamber to withdraw air therefrom;
   means for rotating said drum about said axis to displace said liquid phase through said filter cake; and
   means for forming a continuum consisting of liquid which radiates outwardly through said drum; said drum being adapted to form a filter cake through which a liquid phase can pass outwardly into said chamber with a hydrostatic pressure determined by the rate at which liquid of said continuum is withdrawn from said chamber.
2. The centrifuge defined in claim 1 wherein said axis is vertical.
3. The centrifuge defined in claim 1 wherein the means for withdrawing liquid from said chamber includes an annular compartment surrounding said axis and communicating with said chamber at a location radially outwardly of said drum.
4. The centrifuge defined in claim 3 wherein said chamber is formed with an annular weir over which the liquid flows.
5. The centrifuge defined in claim 4, further comprising an adjustable scoop receivable in said compartment for scooping liquid therefrom.
6. The centrifuge defined in claim 4 which includes a siphon arrangement draining liquid from said chamber.
7. A method of operating a filter centrifuge comprising a perforated drum rotatable about an axis and formed with a filter medium upon which a filter cake can form during filtration, said drum being surrounded by a liquid-collecting compartment rotating together with said drum and having at least one outlet radially outwardly of said filter medium, said method comprising the steps of:
   rotating said drum about said axis at a rate sufficient to induce passage of a liquid phase of a suspension outwardly through said filter medium into said liquid-collecting compartment;
   initially forming a liquid suction-pressure head within said liquid-collecting compartment;
   withdrawing air from said liquid-collecting compartment; and
   maintaining the liquid suction-pressure head so as to produce a continuum consisting of liquid, which radiates outwardly through said drum, resulting from said rotating.
8. The method defined in claim 7 wherein liquid is drained from said liquid-collecting compartment to apply said suction-pressure head to the liquid at said filter medium by centrifugally inducing said liquid to pass through said outlet into an annular trough surrounding said axis and rotatable with said drum, and scooping liquid out of said trough.

* * * * *